US010209384B2

United States Patent
Goodyear et al.

(10) Patent No.: US 10,209,384 B2
(45) Date of Patent: Feb. 19, 2019

(54) PEAK TRACKING AND REJECTION IN ACOUSTIC LOGS

(71) Applicant: Halliburton Energy Services, Inc., Houston, TX (US)

(72) Inventors: Grant Philip Goodyear, Spring, TX (US); Kristoffer Thomas Walker, Kingwood, TX (US); Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 141 days.

(21) Appl. No.: 15/104,478

(22) PCT Filed: Jan. 29, 2016

(86) PCT No.: PCT/US2016/015535
§ 371 (c)(1),
(2) Date: Jun. 14, 2016

(87) PCT Pub. No.: WO2016/123432
PCT Pub. Date: Aug. 4, 2016

(65) Prior Publication Data
US 2018/0038980 A1 Feb. 8, 2018

Related U.S. Application Data

(60) Provisional application No. 62/110,129, filed on Jan. 30, 2015.

(51) Int. Cl.
*G01V 1/40* (2006.01)
*G01V 1/50* (2006.01)

(52) U.S. Cl.
CPC ............... *G01V 1/50* (2013.01); *G01V 1/40* (2013.01); *G01V 2200/14* (2013.01); *G01V 2200/16* (2013.01); *G01V 2210/41* (2013.01); *G01V 2210/47* (2013.01); *G01V 2210/6169* (2013.01); *G01V 2210/6222* (2013.01); *G01V 2210/641* (2013.01)

(58) Field of Classification Search
CPC ..... G01V 1/40; G01V 1/44; G01V 1/50; G01V 2210/41; G01V 2210/47
USPC .............................................. 367/25, 29–31
See application file for complete search history.

(56) References Cited

U.S. PATENT DOCUMENTS 4,168,483 A 9/1979 Parthasarathy et al.
4,210,966 A 7/1980 Ingram
(Continued)

FOREIGN PATENT DOCUMENTS

WO WO-2014/070182 A1 5/2014

OTHER PUBLICATIONS

"International Application Serial No. PCT/US2016/015535, International Search Report dated May 17, 2016", 3 pgs.
(Continued)

*Primary Examiner* — Ian J Lobo
(74) *Attorney, Agent, or Firm* — Haynes and Boone, LLP

(57) ABSTRACT

Disclosed herein is an approach to improving the accuracy of signal-peak tracking in acoustic logs by supplementing a semblance method used to detect signal peaks in individual coherence-, correlation- or amplitude-based semblance maps with consistency checks based on rock-physics constraints and/or based on history and/or future data for the signal of interest.

20 Claims, 13 Drawing Sheets

(56) References Cited

U.S. PATENT DOCUMENTS

| | | | |
|---|---|---|---|
| 4,594,691 A * | 6/1986 | Kimball | G01V 1/48 367/26 |
| 4,683,556 A | 7/1987 | Willis | |
| 5,077,697 A | 12/1991 | Chang | |
| 2003/0002388 A1 | 1/2003 | Mandal | |
| 2003/0206486 A1* | 11/2003 | Valero | G01V 1/48 367/38 |
| 2004/0006428 A1 | 1/2004 | Hsu et al. | |
| 2005/0251342 A1 | 11/2005 | Market et al. | |
| 2009/0005995 A1 | 1/2009 | Tang et al. | |
| 2009/0037111 A1 | 2/2009 | Radtke et al. | |
| 2009/0067286 A1 | 3/2009 | Bose et al. | |
| 2009/0168596 A1 | 7/2009 | Wu et al. | |
| 2011/0188345 A1 | 8/2011 | Wang | |
| 2011/0280101 A1 | 11/2011 | Wang | |

OTHER PUBLICATIONS

"International Application Serial No. PCT/US2016/015535, Written Opinion dated May 17, 2016", 4 pgs.
"International Application Serial No. PCT/US2016/015553, International Search Report dated May 27, 2016", 3 pgs.
"International Application Serial No. PCT/US2016/015553, Written Opinion dated May 27, 2016", 10 pgs.
Mukhopadhyay, P., et al., "Improved resoiution of time- ad frequency-based coherence processing of acoustic array data using differential phase", *SPWLA 54th Annual Logging Symposium*, Jun. 22-26, New Orleans, Louisiana, (2013), 1-7.
Mukhopadhyay, Pradip, et al., "The Differential-Phase Based Time- and Frequency-Semblance Algorithm for Array-Acoustic Processing and its Application to Formation-Slowness Measurements", *Petrophysics*, 54(5), (2013), 475-481.

\* cited by examiner

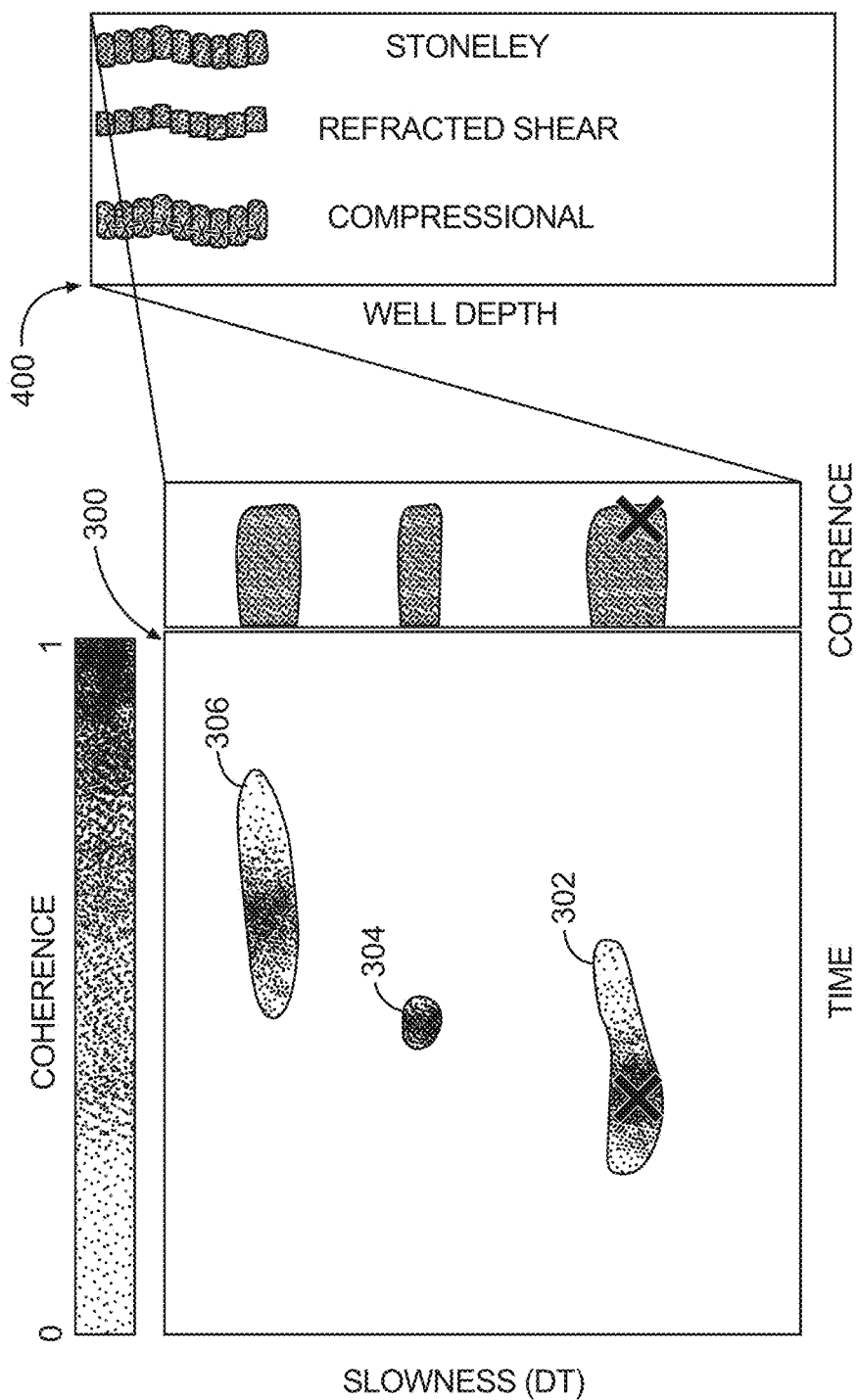

PEAK TRACKING AND REJECTION IN ACOUSTIC LOGS

CLAIM FOR PRIORITY

This application is a U.S. National Stage Filing under 35 U.S.C. 371 from International Application No. PCT/US2016/015535, filed on 29 Jan. 2016, which claims the benefit of U.S. Provisional Application Ser. No. 62/110,129, filed on Jan. 30, 2015, which applications are incorporated by reference herein in their entirety.

BACKGROUND

Acoustic logs are routinely used in the oil and gas industry to characterize the formation around a borehole, e.g., by identifying various types of lithology (such as shale or sandstone), detecting the presence of hydrocarbons, or measuring certain geophysical properties such as stress or permeability. To acquire an acoustic log, a sonic logging tool with one or more acoustic sources and multiple receivers may be run through the borehole (e.g., on a wireline or as part of a bottom hole assembly of a drill string) to excite acoustic waves in the formation and measure the formation response with the receivers at various depths along the borehole. For each depth, the acoustic waveforms acquired by the various receivers may be processed with a semblance (or, as it is also often referred to, beamforming) method to compute a two-dimensional (e.g., time-slowness or frequency-slowness) semblance map that generally exhibits peaks corresponding to the arrivals of various types of acoustic waves (such as compressional, refracted-shear, and Stoneley waves) travelling at different apparent velocities. The identified peaks may be aggregated across depths to obtain, for each type of wave, a log of the wave velocity or slowness (which is the inverse of the velocity) as a function of depth within the borehole.

In practice, uncertainties in the identification of the peaks due to, e.g., noise levels above or signal levels below a detection threshold can result in gaps or, worse, incorrect data in the logs. For example, if a sudden change in velocity occurs, due to a change in the surrounding formation, the compressional wave velocity may not be continuously tracked with sufficient resolution, and the automated tracking method may, instead of identifying the change in velocity, jump to another signal, such as the refracted-shear-wave signal, which may henceforth be misidentified as the compressional signal. As another example, if the compressional-wave signal, which usually corresponds to the signal peak with the highest velocity, is too weak to be detectable, the peak with the highest velocity that is detectable, which may be the refracted-shear-wave peak or a peak in the noise, may be mistaken for the compressional-wave peak.

BRIEF DESCRIPTION OF THE DRAWINGS

FIG. 3 is an example time-slowness coherence map as may be computed from waveforms as depicted in FIG. 2, in accordance with various embodiments.

FIG. 4 is a schematic depiction of logs for three types of acoustic waves, as may be derived from slowness peaks as detected in sequence of coherence maps as shown in FIG. 3.

DETAILED DESCRIPTION

Disclosed herein is an approach to improving the accuracy of signal-peak tracking in acoustic logs by supplementing a semblance method used to detect signal peaks in individual coherence- or amplitude-based semblance maps with consistency checks based on rock-physics constraints and/or based on history and/or future data for the signal of interest. In particular, in various embodiments, false positives in the detection of the compressional-wave slowness peak (hereinafter simply "compressional peak") are reduced by comparing any candidate compressional peaks identified from a semblance map against a predicted compressional peak, and rejecting candidate compressional peaks that fall outside a specified tolerance range (except in cases where a candidate compressional peak falling outside the tolerance range of a history/future-based prediction is confirmed by a prediction based on a rock-physics constraint). Specifically, the prediction of the compressional peak or, more precisely, a wave velocity or slowness associated therewith, may be based on measurements of a dipole shear-wave slowness peak (hereinafter simply "shear peak") in conjunction with an empirical physical constraint relating compressional and shear velocities, or on the velocities of preceding (and/or, in some embodiments, following) compressional peaks. In various embodiments, shear-peak-based and history/future-based predictions are used in combination to improve the overall accuracy of compressional-peak detection. Further, in various embodiments, certain adjustable parameters used in the peak predictions and consistency checks (such as, e.g., tolerance thresholds) are set based on prior optimization with test data sets to improve the performance of the method described herein.

Figure 1A:
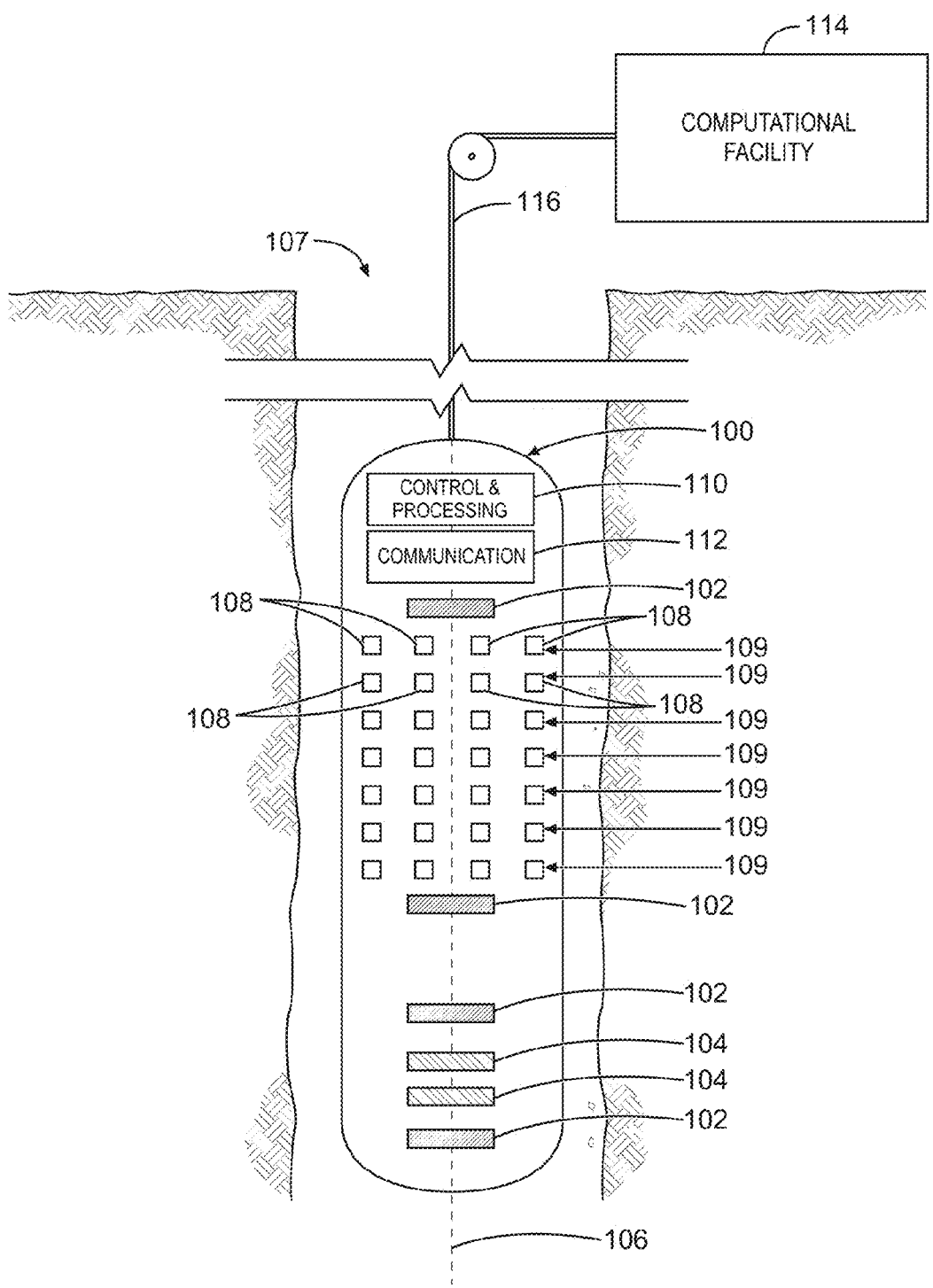
FIG. 1A is a schematic drawing of a sonic logging tool deployed in a borehole in a wireline operation, in accordance with various embodiments.

The foregoing will be more readily understood from the following detailed description of various embodiments and the accompanying drawings. Referring to FIG. 1A, an example sonic logging tool 100 deployed during a wireline operation, in accordance with various embodiments, is shown. The tool 100 includes multiple (e.g., eight) acoustic sources 102, 104 arranged at various positions along the longitudinal tool axis 106 (which, when the tool 100 is deployed in a borehole 107, generally coincides with the borehole axis). The acoustic sources may include both monopole sources 102 that emit acoustic waves omnidirectionally, as well as dipole and/or quadrupole sources 104 that emit directional acoustic waves. The sonic logging tool 100 further includes a plurality of acoustic receivers 108 at various positions along the longitudinal axis, arranged, for example, in an array having multiple rings 109 at the different longitudinal positions, where each ring may include multiple receivers 108 distributed azimuthally around the tool axis 106. For example, in one embodiment, the tool 100 includes thirteen rings 109 of receivers 108 and eight receivers 108 per ring 109 (not all depicted). As will be readily appreciated by those of ordinary skill in the art, different receiver rings 109 generally receive acoustic waves resulting from an emission by one of the acoustic sources 102, 104 with different time delays, due to their varying distances from the source 102 or 104, facilitating the application of semblance/beamforming methods to ascertain the acoustic wave velocity from the measured waves.

The tool 100 may further include control-and-processing circuitry 110 for controlling the operation of the sources 102, 104 and receivers 108 and processing the receiver measurements, as well as a communications module 112 for exchanging data and/or control signals with a surface computational facility 114 via a wired or wireless connection. In general, the functionality for controlling the tool operation and processing the data can be distributed in various ways between the control-and-processing circuitry 110 integrated into the tool 100 and the computational facility 114 located above surface. For example, raw data (e.g., acoustic waveforms) acquired by the receivers 108 may be sent directly to the surface computational facility 114 for processing thereat, or may alternatively be processed by the circuitry 110 to obtain derived data (e.g., computed wave velocities) that are then communicated to the surface. Both the control-and-processing circuitry 110 and the surface computational facility 114 may be implemented with any suitable combination of hardware, firmware, and software, such as, for example, with dedicated electronic circuitry or a suitably programmed general-purpose computer.

The sonic logging tool 100 may be operated periodically, or in cycles ("cyclically"), as the tool 100 is run through (i.e., lowered into or pulled out of) the borehole 107, e.g., on a wireline 116, as shown to acquire acoustic measurements at various depths along the way. (Alternative means of conveyance include, e.g., slickline or coiled tubing.) Within each cycle of operation (corresponding to a certain depth within the borehole), the various acoustic sources 102, 104 may be fired sequentially, at intervals sufficiently large to separate out the formation responses to the various firings in the acoustic waves measured at the receivers 108.

Figure 1B:
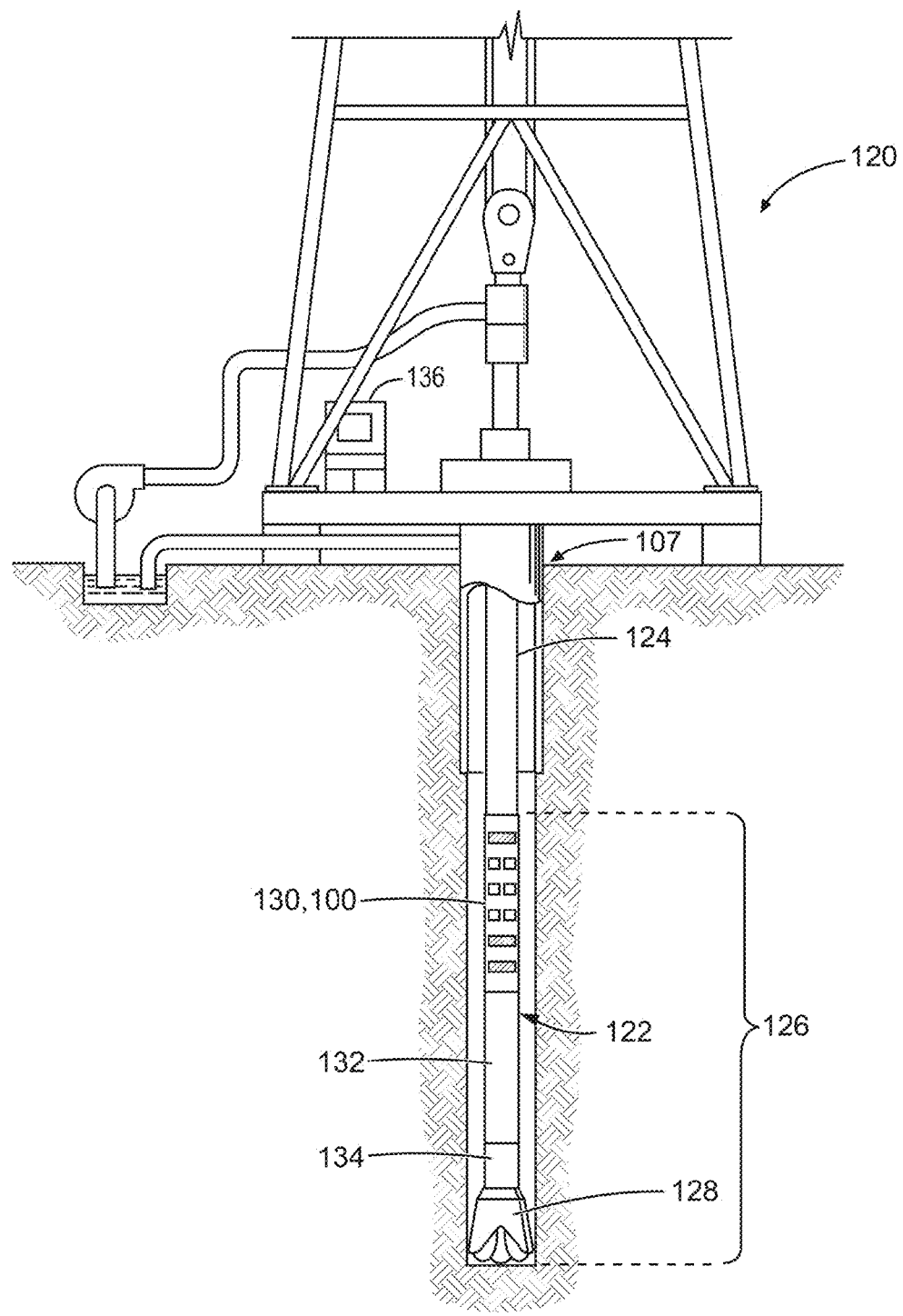
FIG. 1B is a schematic drawing of a sonic logging tool deployed in a borehole in a logging-while-drilling (LWD) operation, in accordance with various embodiments.

Turning now to FIG. 1B, the example logging tool 100 is shown implemented in a drilling system during an LWD operation. The drilling system includes a drilling rig 120 located at the surface and, supported by the drilling rig 120, a drill string 122 for drilling the borehole 107 through the subsurface formations. The drill string 122 includes a drill pipe 124 and, generally located at the lower end of the drill pipe 124, a bottom hole assembly (BHA) 126. The BHA 126 may include the drill bit 128 and, disposed thereabove, one or more drill collars 130, 132, 134, which may contain a number of different tools and instruments adapted for taking measurements during the drilling process. In accordance with various embodiments, these tools may include a sonic logging tool 100 (depicted schematically within collar 130) with multiple acoustic sources 102, 104 and acoustic receivers 108 as well as associated control-and-processing circuitry 110 and a communications module 112 (not all details shown). The tool 100 may be in communication with a surface computational facility 136 implemented with a suitable combination of hardware, firmware, and software, such as a suitably programmed general-purpose computer. Similarly to wireline embodiments, the functionality for controlling the tool operation and processing the data can be distributed in various ways between the control-and-processing circuitry 110 integrated into the tool 100 and the computational facility 136 located above surface.

Figure 2:
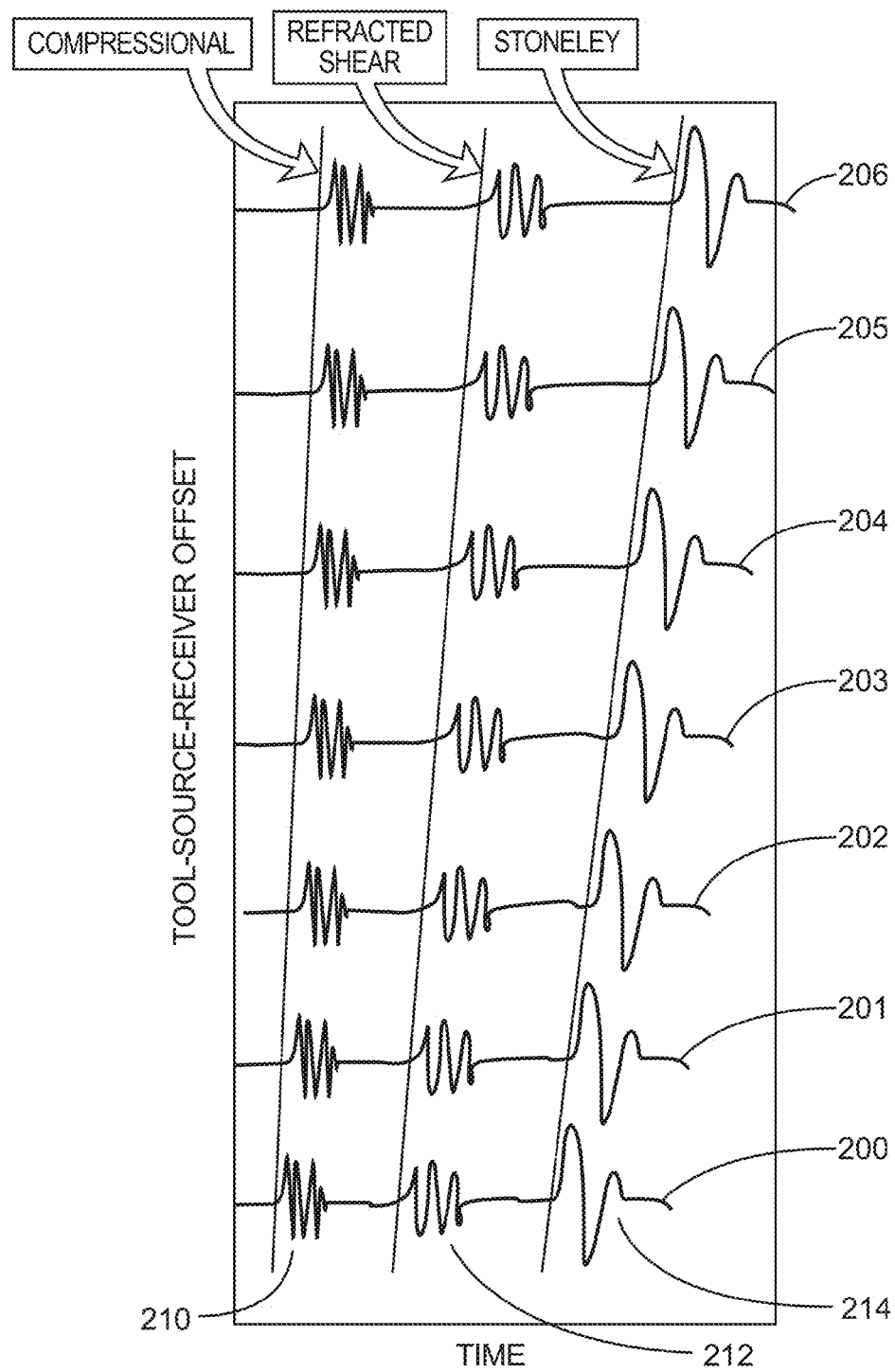
FIG. 2 is a graph showing example acoustic waveforms measured, in accordance with various embodiments, with seven receivers placed at different distances from the acoustic source, each waveform reflecting the arrival of three types of acoustic waves.

FIG. 2 conceptually illustrates example waveforms 200-206 that may result from acoustic-wave excitation in a borehole by a single monopole acoustic source, as measured with seven receivers (e.g., receiver rows 109, or individual receivers 108 therein) placed at seven different distances from the source. The waveforms 200-206 are similar in their signatures, each including three distinct signals 210, 212, 214 of varying amplitudes, which correspond to the arrivals of the compressional wave, refracted shear wave, and Stoneley wave, respectively. Usually, as shown, the compressional wave arrives first, followed by the refracted shear wave, and then the Stoneley wave. Further, the arrival time (on an absolute scale) of each signal varies from receiver to receiver, due to the receivers' different distances from the source, which cause different time delays. From the time delays, evaluated across the various waveforms 200-206, but separately for each type of signal 210, 212, 214, the velocity of each type of wave (or the average velocity in the direction parallel to the sonic tool) may be inferred. Various semblance methods well-known in the art may be used to do so. One example of a suitable semblance method is the Differential Phase Time Semblance (DPTS) method described in Mukhopadhyay, P., et al., 2013, "The Differential-Phase Based Time- and Frequency-Semblance Algorithm for Array-Acoustic Processing and its Application to Formation-Slowness Measurements," Petrophysics, vol. 54, pp. 475-81.

Semblance methods generally involve correlating waveforms acquired by different receivers for a range of realistic wave velocities or slownesses (the slowness s being the inverse of the velocity v along the tool or borehole axis, i.e., $s=1/v$). (The term "correlating" is herein used broadly to denote the determination of any metric capturing the degree of similarity between the various waveforms (appropriately shifted), such as, without limitation, a cross-correlation in the stricter mathematical sense, a coherence metric, or an amplitude average.)

FIG. 3 conceptually illustrates an example time-slowness semblance map 300 as may be obtained by applying a suitable semblance method (such as DPTS) to the waveforms as depicted in FIG. 2. The map 300 covers a "search space" having the dimensions of time t (horizontal direction) and slowness s (vertical direction). Slowness is conventionally used in semblance maps for acoustic data; however, it should be understood that the map 300 may alternatively directly reflect the velocity. Further, instead of time, frequency may be used for waveforms that have been Fourier-transformed. The term "semblance map," as used herein, encompasses maps with any combination of a time or frequency dimension and a slowness or velocity dimension, and applies to maps obtained by coherence-, correlation-, or amplitude-based semblance methods.

The map 300 shows, for each time sample within the acoustic waveforms and each trial slowness (which relates to a time delay between the wave arrivals at the various receivers), a level of coherence between the waveforms, reflected in the grey-scale value of the map. For the correct slowness, the coherence peaks, i.e., reaches a local maximum. As can be seen, the three signals 210, 212, 214 contained in the waveforms of FIG. 2 result in three such peaks. The "fastest" peak 302 (i.e., the peak associated with the smallest slowness value) corresponds to the compressional arrival, and the other two peaks 304, 306 correspond to the refracted-shear and Stoneley arrivals, respectively.

The velocity of the compressional, shear, and Stoneley waves, and thus the location of the compressional, shear, and Stoneley peaks 302, 304, 306 in the time-slowness coherence map 300, may change from cycle to cycle due to varying formation properties at different depths. These changes can in principle be tracked and visualized with acoustic logs that aggregate the peak data over many cycles, resulting in velocity or slowness data as a function of depth for each of the tracked signals (i.e., for each type of acoustic wave measured). FIG. 4 conceptually illustrates an example log 400 showing signal traces for compressional, refracted shear, and Stoneley waves, respectively.

In practice, the various signal traces in acoustic logs often have gaps in places where the slowness peaks cannot be reliably identified from the semblance maps. For example, the compressional signal amplitude is sometimes so low that it does not pass quality-control thresholds for detections derived from the semblance map. It can also happen that portions of the log data are incorrectly interpreted as a result of automated methods that misidentify slowness peaks. Such misidentification can result from high levels of noise in the acoustic waveforms and, consequently, in the semblance maps, or from missing signal peaks or rapidly changing geological changes along the well. For instance, if the (true) compressional peak is not discernable in the semblance map, an algorithm designed to simply pick the fastest peak as the compressional peak may erroneously pick either the shear peak, or another local peak resulting from noise.

Various embodiments are directed to improving the peak-selection process by utilizing supplemental information about the location of the compressional peak. One type of information is the history of the peak slowness as reflected in the compressional-slowness trace of an acoustic log (e.g., as shown in FIG. 4). If a sufficient number of "correct" compressional peaks has been obtained, these prior values may be used to predict a range of slownesses that should span the current correct peak value. More generally, a compressional peak in a particular cycle may be predicted based on the compressional peaks detect in neighboring cycles, whether preceding or following the cycle of interest. The use of future data (relative to the cycle of interest) is feasible in embodiments where the acoustic logs are not computed until after the acquisition of the raw data, or at least of a portion thereof corresponding to multiple cycles, has been completed. In embodiments where compressional peaks are identified and logs computed in real-time, only historical data are available.

Another type of information that can be useful in accurately identifying the compressional peak is the shear peak as detected in a time-slowness coherence map, or other semblance map, obtained based on a dipole excitation. The formation response to a dipole excitation can be measured and processed in a similar manner as that of a monopole excitation (as described with respect to FIGS. 2 and 3). However, a dipole excitation in sonic logging tools generally results in a high-amplitude flexural wave and, as a consequence, an easily distinguishable, high-amplitude signal peak in the semblance map corresponding to the shear peak. This simplifies and increases the accuracy of dipole-based shear-peak detection, compared with that of compressional-peak detection in monopole-induced acoustic data. Accordingly, dipole shear slowness peak tracking is generally more stable than that for monopole peaks. In various embodiments, this fact is capitalized on by using an empirical or theoretically derived relationship between the compressional velocity and the shear velocity, which may reflect a physical constraint imposed by the formation, to predict a range of reasonable values of the compressional velocity $V_c$ from the shear velocity $V_s$ as determined by dipole measurements. One example of such a rock-constraint are the well-known Castagna relations (as described, e.g., in Castagna, J. P., et al., 1993, "Rock physics—The link between rock properties and AVO response, in Offset-dependent reflectivity—Theory and practice of AVO analysis," in Investigations in Geophysics, 8, SEG, pp. 135-171), which can be expressed for various types of rocks as follows:

$$v_s=0.05508v_c^2+1.01677v_c-1.03049 \text{(limestone)}$$

$$v_s=0.80416v_c-0.85588 \text{(sandstone)}$$

$$v_s=0.58321v_c-0.07775 \text{(dolomite)}$$

$$v_s=0.76969v_c-0.86735 \text{(shale)}$$

Other rock-physics constraints that may be useful in accordance with various embodiments include Brie, Han, and Krief relations, as described, e.g., in Brie, A., et al., 1995, "Shear sonic interpretation in gas bearing sands," Proceedings of SPE annual technical conference and exhibition, SPE 30595, 701-710, doi: 10.2118/30595-MS; Han, D.-H., 1986, "Effects of porosity and clay content on acoustic properties of sandstones and unconsolidated sediments," PhD thesis, Stanford University; and Krief, M., et al., 1990, "A petrophysical interpretation using the velocities of P and S waves (full-waveform sonic)," The Log Analyst, 31, pp. 355-369.

Figure 5:
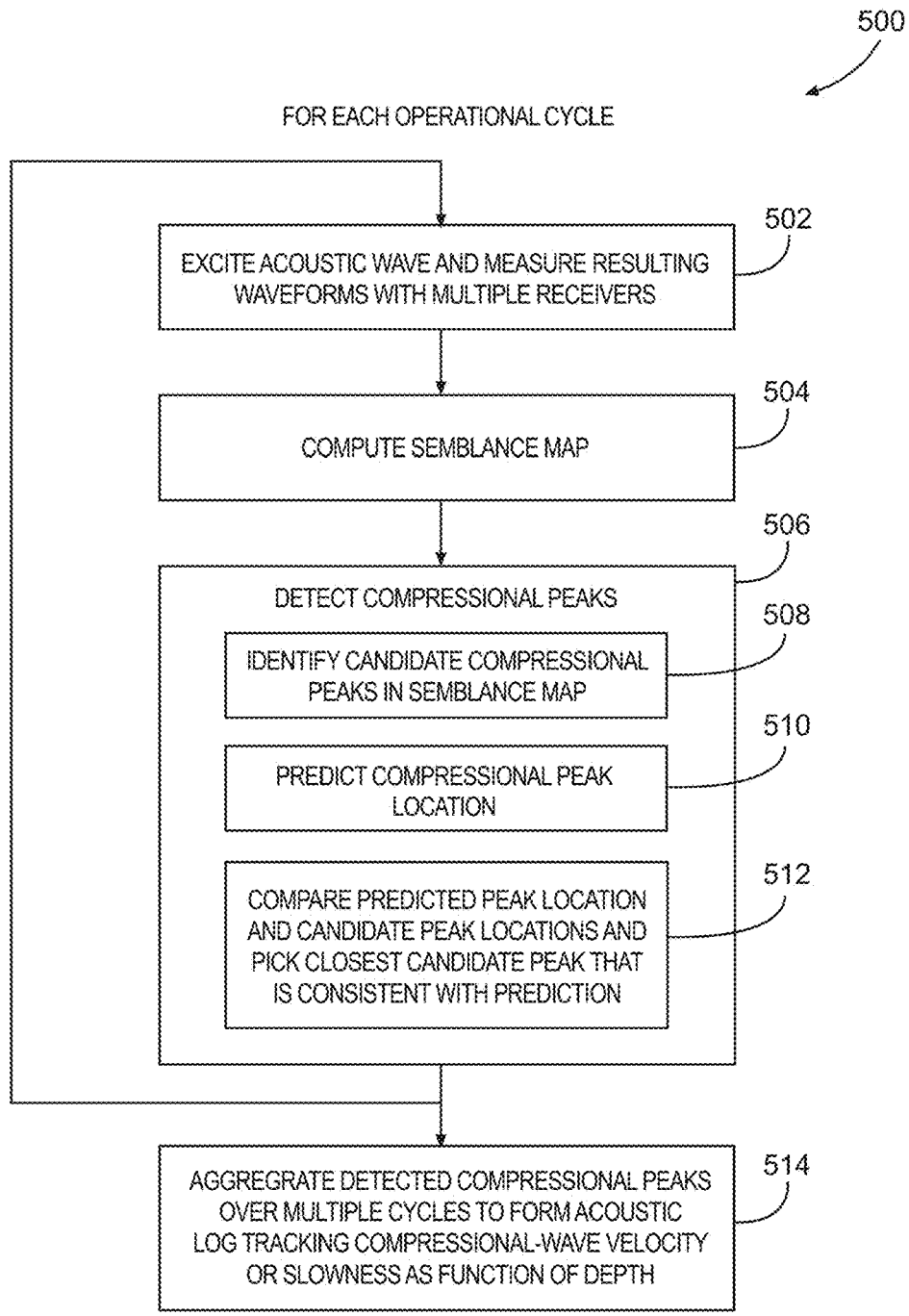
FIG. 5 is a flowchart of an example acoustic logging method including compressional-peak detection in accordance with various embodiments.

FIG. 5 illustrates, in the form of a flow chart, a method 500, in accordance with various embodiments, for improved compressional-peak detection using a combination of compressional-peak history and dipole-based shear-peak data. The method involves, in action 502, cyclically operating a sonic logging tool (e.g., as depicted in FIG. 1A) deployed within the borehole, each cycle of operation including emissions of both acoustic monopole and acoustic dipole waves and measurements of the resulting acoustic waveforms with a plurality of receivers. The acoustic waveforms measured with the plurality of receivers are processed for each cycle of operation to compute semblance maps (e.g., without limitation, time-slowness coherence maps or frequency-slowness coherence maps) for the various acoustic emissions (action 504), using a suitable semblance method such as, e.g., the DPTS method. Compressional-wave slowness peaks are then detected (action 506) in the semblance maps. This action involves identifying candidate compressional peaks in the semblance maps (action 508). In some embodiments, all local peaks above a certain amplitude threshold (including, e.g., shear and Stoneley peaks) are treated as candidates. In other embodiments, only a subset of the local peaks exceeding the threshold for peak detection is used from the outset, e.g., based on their associated slowness. (Thus, if, for instance, a Stoneley peak can be confidently identified as such, there will be no need to treat such a peak as a candidate for the compressional peak.) Further, compressional-peak detection in accordance herewith involves predicting the location of the compressional peak within the semblance map (specifically, its velocity or slowness) for the current cycle (action 510). The prediction may be based on compressional peaks detected in neighboring (e.g., preceding) cycles and/or on a shear-wave slowness peak detected, for the cycle, in a semblance map computed from measured acoustic waveforms resulting from a dipole acoustic-wave emission. The locations of the candidate compressional peaks are then compared with those of the predicted compressional peak, and the candidate peak closest to the predicted peak is selected as the compressional peak for the cycle, provided that is consistent with the predicted dipole shear-wave peak, within specified tolerance limits (action 512). In some instances, e.g., when the actual compressional peak fails below the detection threshold, all of the candidate peaks may be inconsistent with the predicted peaks (i.e., fall outside the tolerance limits) and therefore rejected; in this case, the method simply does not return any compressional peak. Omitting a result in such cases where the available data is inconclusive is generally preferable over returning a false peak. Nonetheless, by using a combination of history- and dipole-based consistency checks as described herein, the present methods may reduce the number of missed compressional peaks (false negatives), as they may facilitate relaxing other peak-detection criteria (e.g., lowering the threshold for candidate peak detection). The detected compressional peaks during multiple cycles may be aggregated into an acoustic log to track the compressional wave velocity as a function of depth in the borehole (action 514).

The various actions 504-512 involving the processing of the measured acoustic waveforms to detect and track compressional slowness peaks may be carried out using a processing facility implemented, for example, by the control-and-processing circuitry 110 of the logging tool 100, the surface computational facility 114 or 136, or a combination of both. The processing facility may be or include a suitably programmed general-purpose or special-purpose computer, such as, in some embodiments, a computer including a general-purpose processor and associated memory storing a set of processor-executable instructions.

Figure 6:
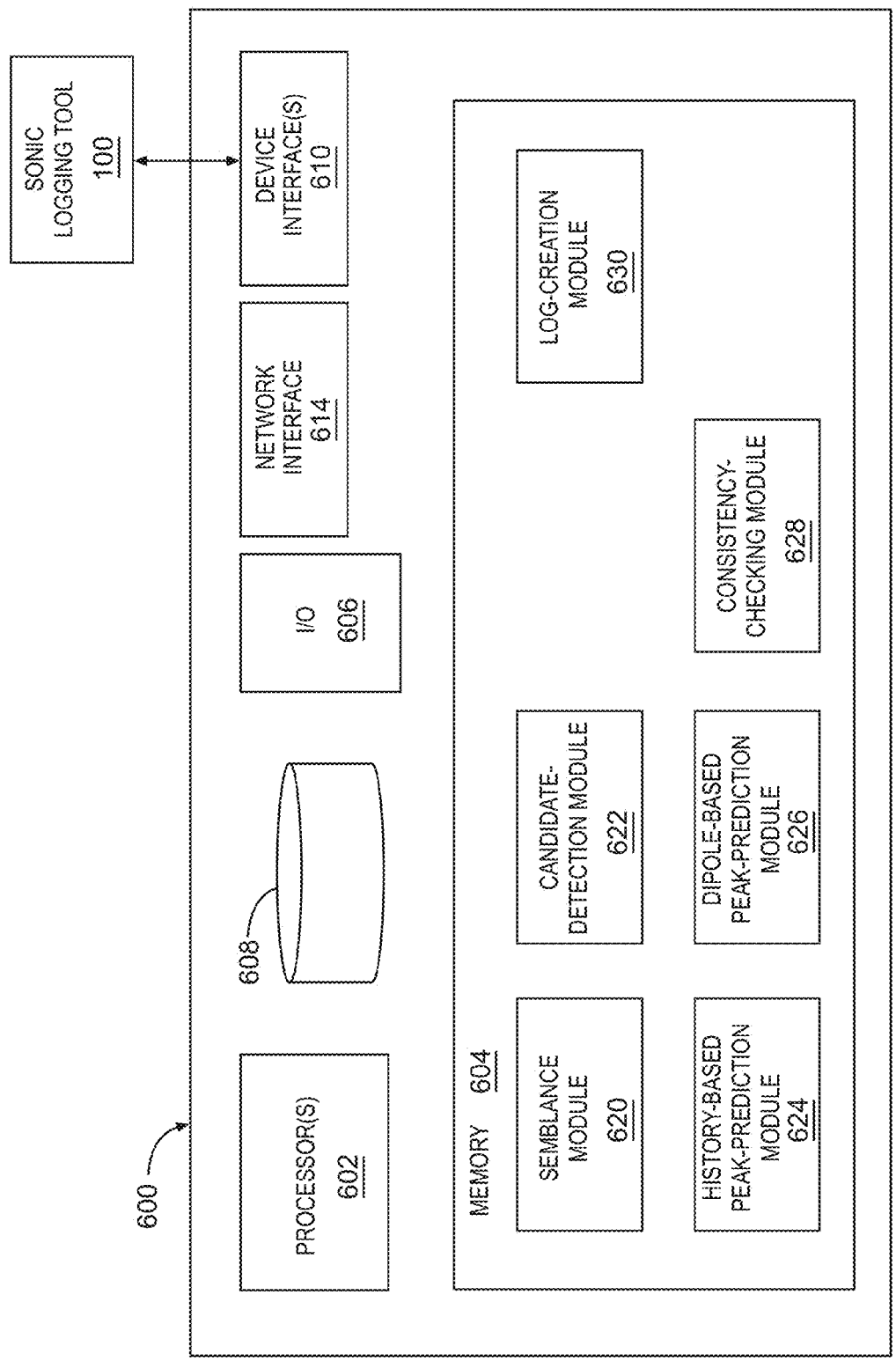
FIG. 6 is a block diagram of an example processing facility for implementing the computational functionality of the method of FIG. 5, in accordance with various embodiments.

FIG. 6 is a block diagram of an example processing facility, in the form of a suitably programmed general-purpose computer, for implementing the computational functionality of the method of FIG. 5. The processing facility 600 includes one or more processors 602 (e.g., a conventional central processing unit (CPU), graphical processing unit, or other) configured to execute software programs stored in memory 604 (which may be, e.g., random-access memory (RAM), read-only memory (ROM), flash memory, etc.). Further, the processing facility 600 may include user input/output devices 606 (e.g., a screen, keyboard, mouse, etc.), permanent data-storage devices 608 (including, e.g., solid-state, optical, and/or magnetic machine-readable media such as hard disks, CD-ROMs, DVD-ROMs, etc.), device interfaces 610 for communicating directly or indirectly with the sonic logging tool 100, a network interface 614 that facilitates communication with other computer systems and/or data repositories, and a system bus (not shown) through which the other components communicate.

The software programs stored in the memory 604 include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a semblance module 620 for the computation of semblance maps from acoustic waveforms; a candidate-detection module 622 for thresholding the semblance maps to identify candidate peaks; peak-prediction modules 624, 626 for the history-based and dipole-based peak prediction, respectively; a consistency-checking module 628 for determining whether a candidate peak is within specified tolerance limits of the predicted peak; and a log-creation module 630 for assembling the individual compressional peaks into a log of compressional-wave velocity or slowness as a function of depth. Of course, the depicted organization into modules is merely one non-limiting example of ways in which instructions that implement the disclosed functionality can be grouped. Many different software and hardware implementations providing the functionality of peak detection and tracking methods as described herein (in summary with reference to FIG. 5, and in more detail below) will readily occur to those of ordinary skill in the art.

Figure 7:
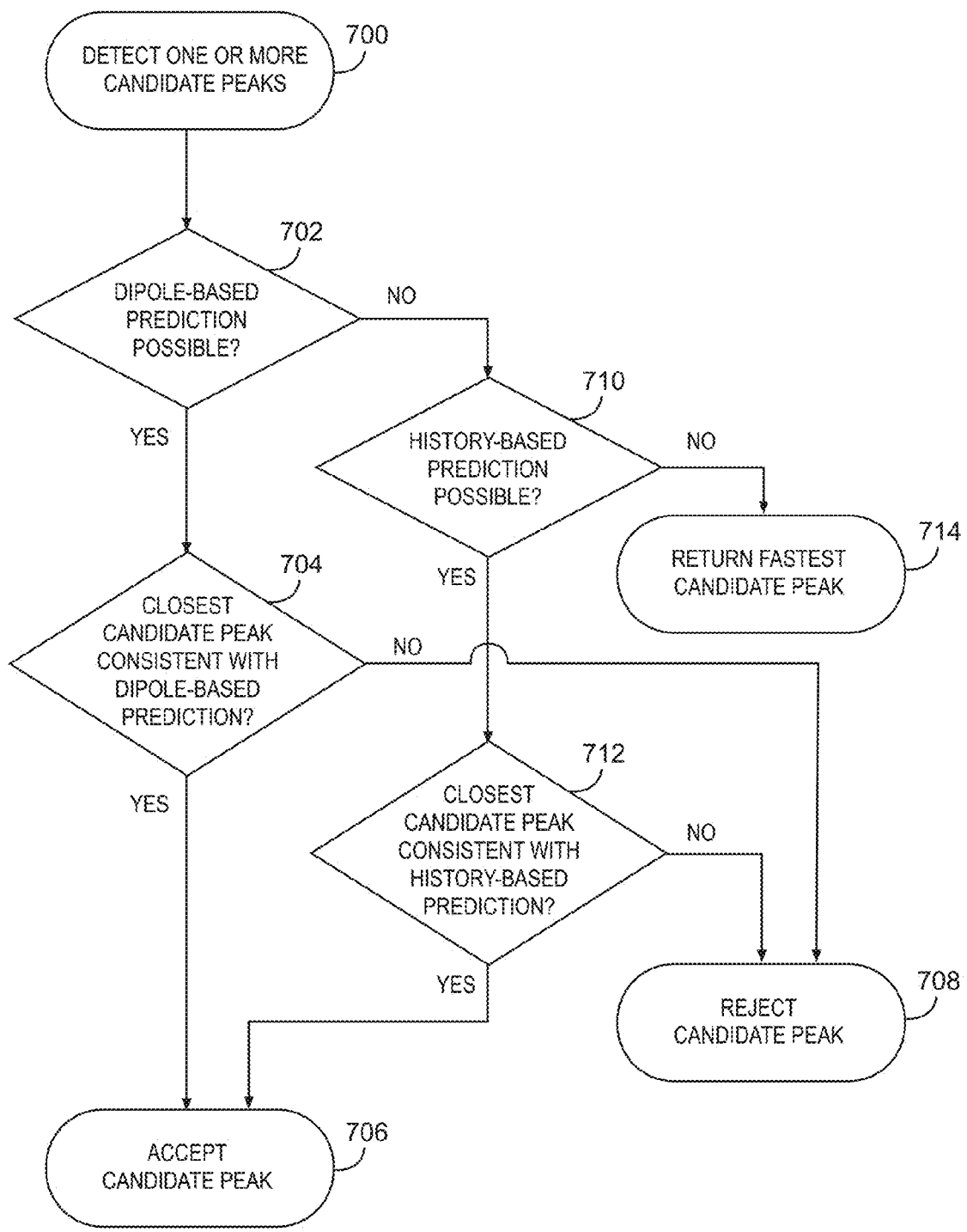
FIG. 7 is a decisional flowchart of a peak-prediction method, in accordance with various embodiments, that may form part of acoustic logging methods as shown, e.g., in FIG. 5.

FIG. 7 is a decision flowchart showing in more detail how the history of the compressional peak resulting from a monopole excitation and the dipole-based shear peak can be used to predict the current compressional peak and check any candidate peak for consistency with the prediction. The chart reflects possible sets of inputs, assumptions, and expected outcomes. The starting point for each cycle is the detection (at 700) of one, and possibly several, slowness peaks in the semblance map; these peaks are treated as candidates for the sought compressional peak. If a shear peak resulting from a dipole excitation is available and useful for predicting the compressional peak (as determined at 702), consistency with the dipole-based predicted compressional peak is dispositive: if the candidate peak closest to the predicted peak is consistent with the dipole-based prediction within specified tolerance limits (e.g., the candidate peak has a velocity within a specified range around the velocity of the predicted compressional peak) (as determined at 704), the candidate peak is accepted as the correct compressional peak (at 706); otherwise, the candidate peak is rejected (at 708). If a dipole-based shear peak is not available or not useful for predicting the compressional peak, and if the compressional-peak history (herein broadly understood to encompass both past and future values relative to the current peak) renders a prediction of the current compressional peak possible (which is generally the case if, e.g., at least three compressional peaks are available within a given time window preceding and up to the given time or cycle) (as determined at 710), the current compressional-peak velocity is predicted based on the history, and the predicted peak is compared against the candidate peaks. In this case, if the candidate peak closest to the predicted peak is consistent with the history-based prediction within specified tolerance limits (i.e., the candidate peak has a velocity within a specified range around the velocity of the peak predicted by the history) (as determined at 712), that candidate peak is returned as the correct compressional peak for the cycle (at 706). If the predicted peak and the closest candidate peak are inconsistent, the candidate peak is rejected as untrustworthy (at 712). (As will be noted, in accordance with the depicted embodiments, the dipole-based prediction is dispositive of whether a candidate peak is accepted or rejected, regardless of whether the history-based prediction is consistent with the candidate peak or not (and, in fact, a history-based prediction need not even be made if a dipole-based prediction is possible); this serves to avoid rejecting a correct compressional peak in instances where the history-based prediction, which generally results in a predicted peak close to the previous peaks, is wrong due to a sudden actual change in the velocity of the compressional wave, as may be caused by a substantial change in formation properties at a certain depth.) Finally, if neither the compressional-peak history nor the dipole peak enables prediction of the compressional peak, the candidate peak with the highest velocity (or smallest slowness) may be returned by default (at 714). Example algorithms for the two peak-prediction methods used in embodiments hereof are now described in more detail.

Figure 8:
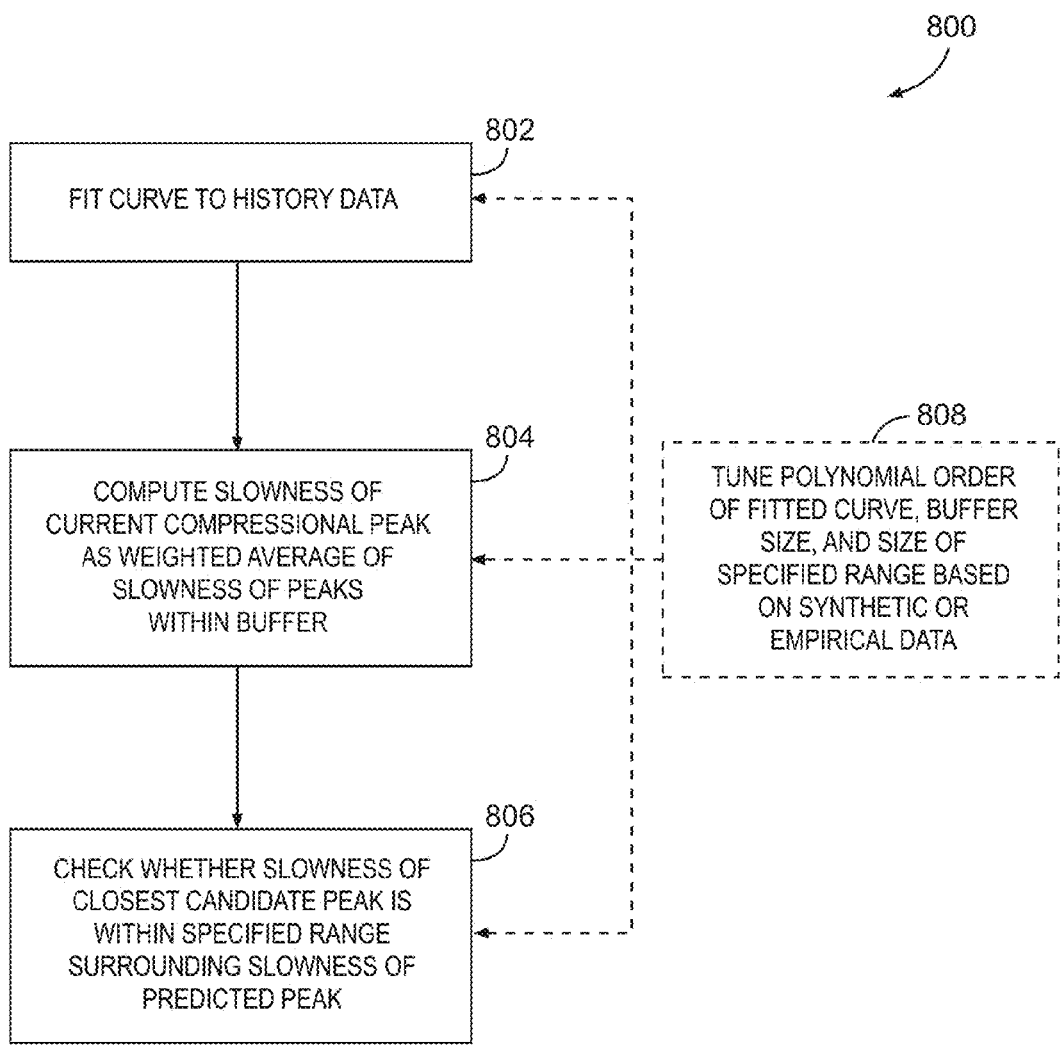
FIG. 8 is a flowchart of a history-based peak-prediction method in accordance with various embodiments.

FIG. 8 is a flowchart of a history-based peak-prediction method 800 in accordance with various embodiments. Assume that acoustic measurements are sampled evenly in time:

$$t_i = i\Delta t$$

If is the current sample, then $s_o^c, s_1^c, s_2^c, \ldots s_{i-1}^c$ correspond to values of the compressional slowness that have previously been assigned. Slowness values are necessarily positive numbers, but if the j-th value could not be adequately assigned, then $s_j$=BADVAL, where BADVAL is a large negative number (or other indicator of a bad value Assume further that the current monopole semblance map has led to a set of n≥1 candidate slowness peaks:

$$MP_i = \{p_1, p_2, \ldots p_n\}.$$

The goal of the peak prediction is to determine whether one of the current measured slowness peaks is reasonable, given the recent set of slowness peaks. In accordance with various embodiments, the measure of reasonableness is to use the last b compressional slowness values to fit a curve (e.g., a second-order or higher-order polynomial) through the data, using, e.g., a (regular, generalized, or robust) least-squares fit (action 802). This fit may then be used to predict the current slowness as a weighted average of the previous b compressional slowness peaks:

$$P_i = \Sigma_{m=-b}^{-1} c_m s_{i+m}^c,$$

where the sum only includes previous slowness values that are not equal to BADVAL (action 804). Note that the predicted compressional slowness can be expressed as a linear combination of the previous compressional slowness values regardless of the order of the curve fit. For a least-squares quadratic fit, the weights $C_m$ can be computed as set forth below in Appendix A. In general, the minimum number of recent slowness peaks required for a fit depends on the order of the polynomial fit. For a quadratic fit, at least three valid previous slowness values are needed. This requirement could fail either because i<3 (as is the case if the algorithm just started up and has not yet buffered enough historical points) or because enough of the b previous slownesses were flagged as untrustworthy that there simply is not enough valid data in the buffer to make a prediction.

Determining whether a candidate peak exists where predicted involves, in accordance with various embodiments, finding the peak $p_\alpha$ that is closest to the predicted value, $P_i$, and checking whether $p_\alpha$ falls in a range $$p_\alpha \in [(1-t_p)P_i, (1+t_p)P_i],$$

where $t_p$ is a fractional threshold (action 806). The value of $t_p$ as well as the buffer size b and the polynomial order of the fitted curve are adjustable parameters that may be tuned based on tests of the peak detection method with empirical or synthetic data (action 808).

Figure 9:
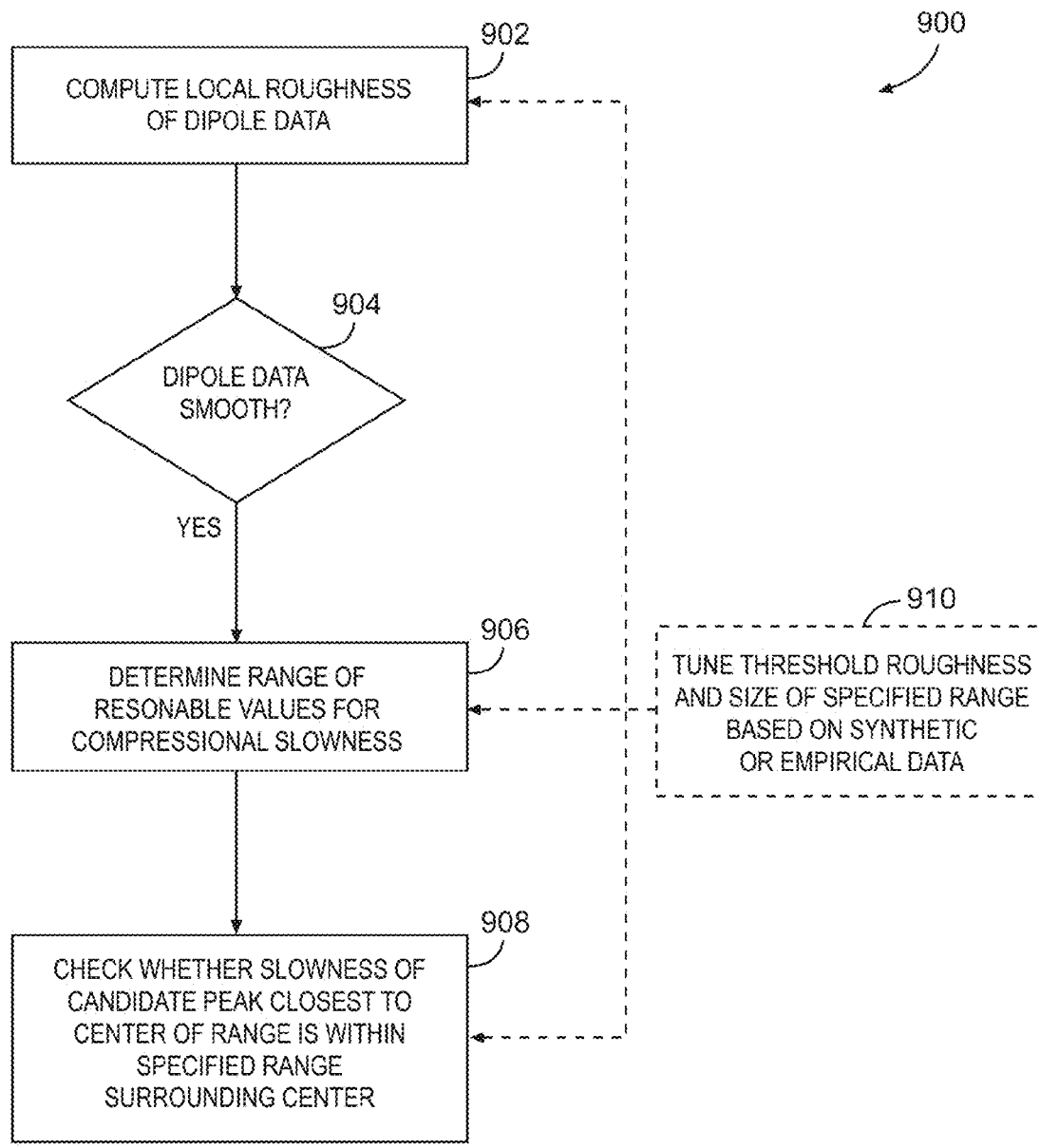
FIG. 9 is a flowchart of a dipole-based peak-prediction method in accordance with various embodiments.

FIG. 9 is a flowchart of a dipole-based peak-prediction method 900 in accordance with various embodiments. In accordance with various embodiments, prior to using a rock-physics constraint to predict the compressional velocity from the shear velocity, the stability of the dipole-based shear velocity or slowness is assessed. In some embodiments, stability is measured in terms of the local "smoothness" (or "roughness") of the dipole data (computed in action 902). A function that is locally smooth generally has a relatively small absolute value of the second derivative. To quantify what "small" is, the second derivative of the dipole-based shear smoothness $s_{(sDP)}$ may be divided by a running average of the shear smoothness values stored in a buffer. Thus, the local roughness for the current ith depth may be defined as:

$$R_i = \left( \frac{s_{(sDP)(i-2)} - 2s_{(sDP)(i-1)} + s_{(sDP)i}}{\langle s_{(sDP)} \rangle} \right)^2$$

The dipole data for a given cycle is considered smooth, as determined at 904, if the local roughness is smaller than a threshold roughness value:

$$R_i < t_r$$

If a stable shear slowness can be determined from the dipole measurements, the Castagna relations or other rock-physics constraints (as described above) may be used to determine a range of reasonable values for the compressional slowness $s_c$ (action 906). For instance, in the absence of any information about the lithology in which the acoustic waves are measured, the range may be based on the extremes of the compressional slownesses computed over the different formation lithologies. If $p_\alpha$ is the monopole peak that is closest to the center of the range of dipole-predicted $s_c$ values, then that peak is considered to be consistent with the dipole measurement if $$p_\alpha \in \left[ (1-t_d)\min\left(\frac{1}{v_c}\right), (1+t_d)\max\left(\frac{1}{v_c}\right) \right]$$

where $t_d$ is a specified fractional threshold (as determined in action 908). The values of $t_d$ as well as the threshold roughness $t_R$ may be set or tuned based on tests performed on empirical or synthetic data (action 910).

In various embodiments, dipole measurements are acquired based on excitations from two acoustic dipole sources (e.g., the two sources 104 depicted in FIG. 1) that emit waves in mutually perpendicular directions. If a stable shear velocity or slowness can be determined for at least one of the excitations, it may be used to predict the compressional velocity or slowness. In the event that measurements for both dipole excitations result in a stable shear velocity, peak prediction may be based on the average of the two shear velocities or slownesses.

As mentioned above, various adjustable parameters that go into the peak predictions and consistency checks described herein, such as, for instance, the fractional peak-location thresholds $t_p$ and $t_d$ associated with history-based and dipole-based consistency checks, the buffer size b and polynomial order of the fitted curve used in history-based predictions, and the roughness threshold $t_R$ used to assess the stability of the dipole measurements, may be determined in an optimization or tuning method that utilizes experimental or synthetic data.

Figure 10A:
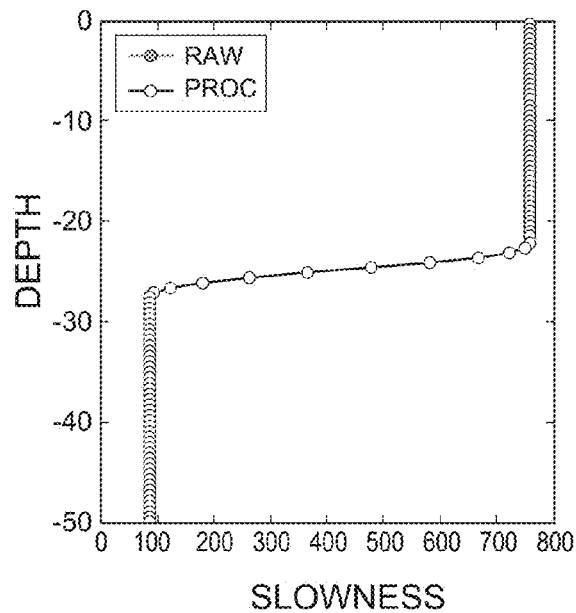
FIGS. 10A-10D are synthetic acoustic logs illustrating the performance of a peak-tracking method with tuned parameters in accordance with various embodiments.
Figure 10B:
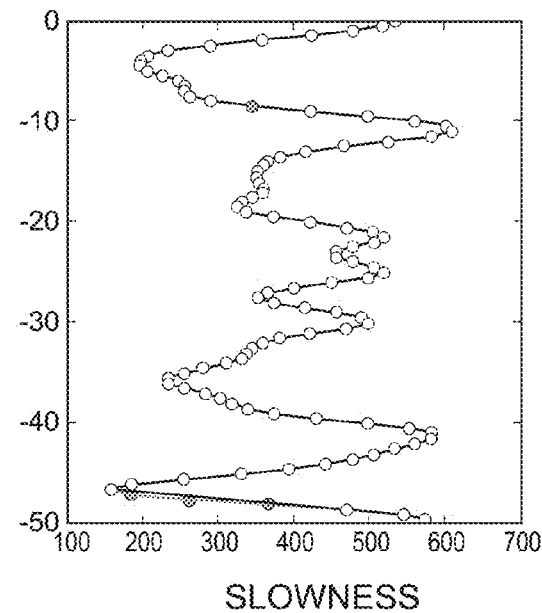
Figure 10C:
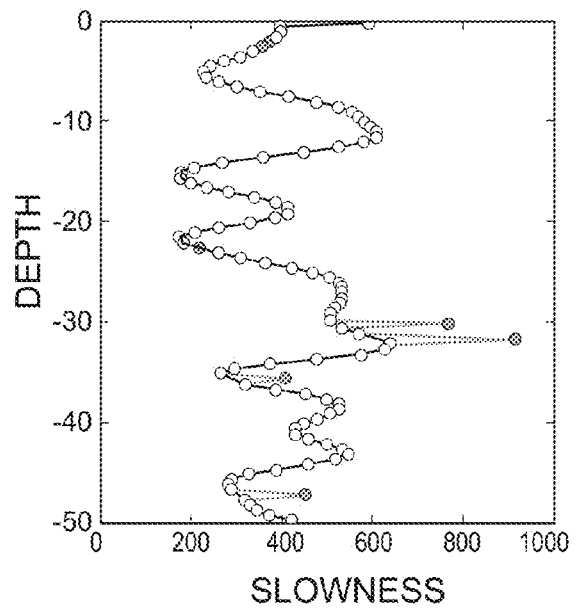

FIGS. 10A-10D are synthetic acoustic logs illustrating the performance of a compressional-peak-tracking method with tuned parameters in accordance with various embodiments. Synthetic data sets were created for a one-hundred-foot-long well section based on a specific geological model that was convolved with a 13-point Gaussian function (across 0.5-foot depth increments) to approximate the averaging operator of an example sonic-tool aperture. The result is a smoothed sonic response (in terms of measured slowness values) to a discrete formation change. FIG. 10A illustrates a compressional-slowness geological model including a single discrete interface between 85 μs/ft and 770 μs/ft formations at 25' depth (and not reflecting any noise). FIG. 10B illustrates a geological model including interbedded layers of 85 μs/ft and 770 μs/ft at several random depths (and likewise not reflecting any noise). These two data sets are assumed to simulate what the sonic logging tool is measuring in the absence of any problems, and, therefore, one criterion for tuning the adjustable parameters is to capture as many of the data points as possible. FIG. 10C illustrates a model including interbedded layers at random depths as in FIG. 7B, but with noise added in the form of relative slowness jumps of 50% at four different locations. Three additional data sets, similar to that of FIG. 10C, were created with four random slowness jumps having relative values of 15%, 7%, and 3% (not depicted). Based on these four noisy data sets, the adjustable parameters are to be tuned to flag as many of the bad values as possible.

Parameter tuning for history-based peak prediction and consistency check was performed by running the algorithm through an exhaustive set of combinations of the order of the least squares fitting (linear or quadratic), the size of the buffer b (between 3 and 9, inclusive), and the size of the peak threshold $t_p$ (between 10%, 20%, 30%, and 40%) for each of the six tuning data sets (two without noise and four with noise). The priority in the tuning was to demand that all of the bad data points in FIG. 10C should be rejected, and that all of the points in FIG. 10A be correctly picked. After meeting those requirements, the number of rejected points in FIG. 10B should be minimized, and the same should be true for the lower-noise (15%-and-less) data sets that are not shown. In FIGS. 10A-10C, raw data are depicted with gray-filled symbols, and data processed using a history-based tracking approach, with parameters tuned as described, are depicted with open symbols.

Figure 10D:
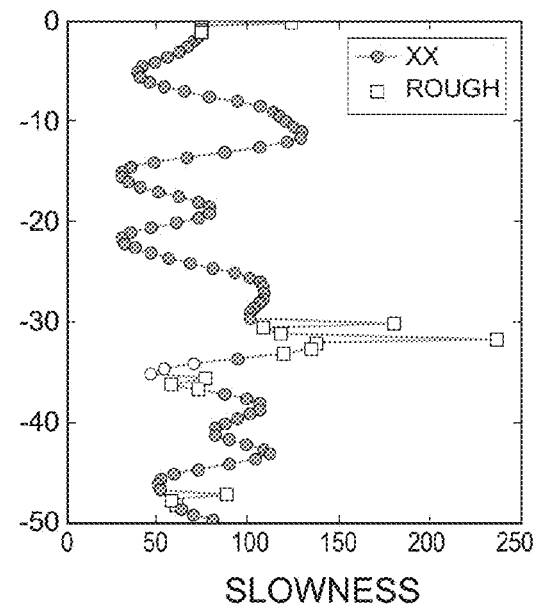

The same synthetic data sets were used to tune the parameters for the dipole-based prediction and consistency check (FIG. 10D). For each data set, the $s^c$ values from FIG. 10C were transformed to give a set of dipole-based shear slownesses in FIG. 10D. FIG. 10D shows the best-tuned result for that latter case, with solid circles indicating the raw data and open square indicating points that are flagged as locally rough and therefore untrustworthy for compressional peak tracking consistency checking.

Figure 11A:
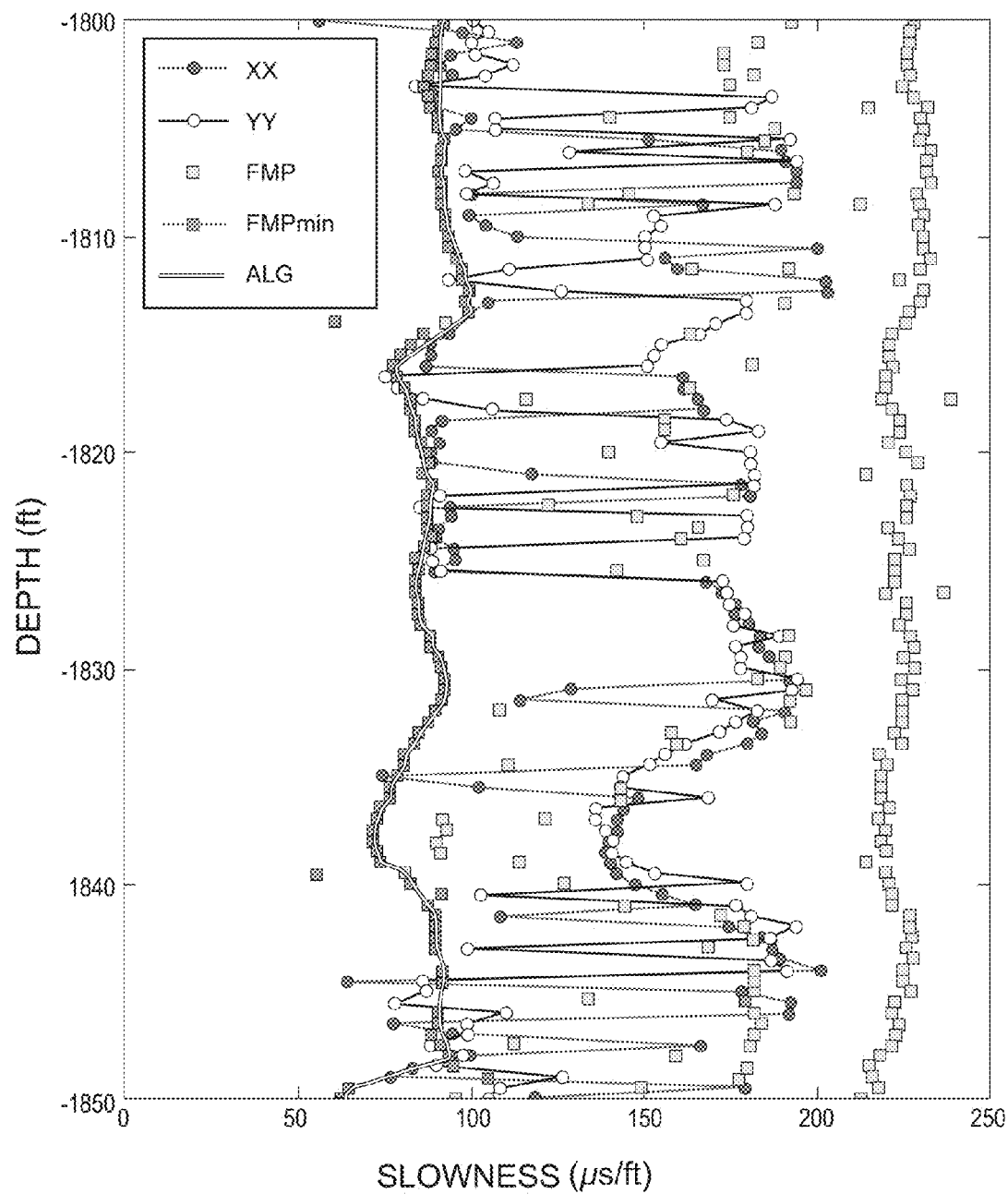
FIGS. 11A, 11B, and 12 are real acoustic logs illustrating the performance of a peak-tracking method in accordance with one embodiment.
Figure 11B:
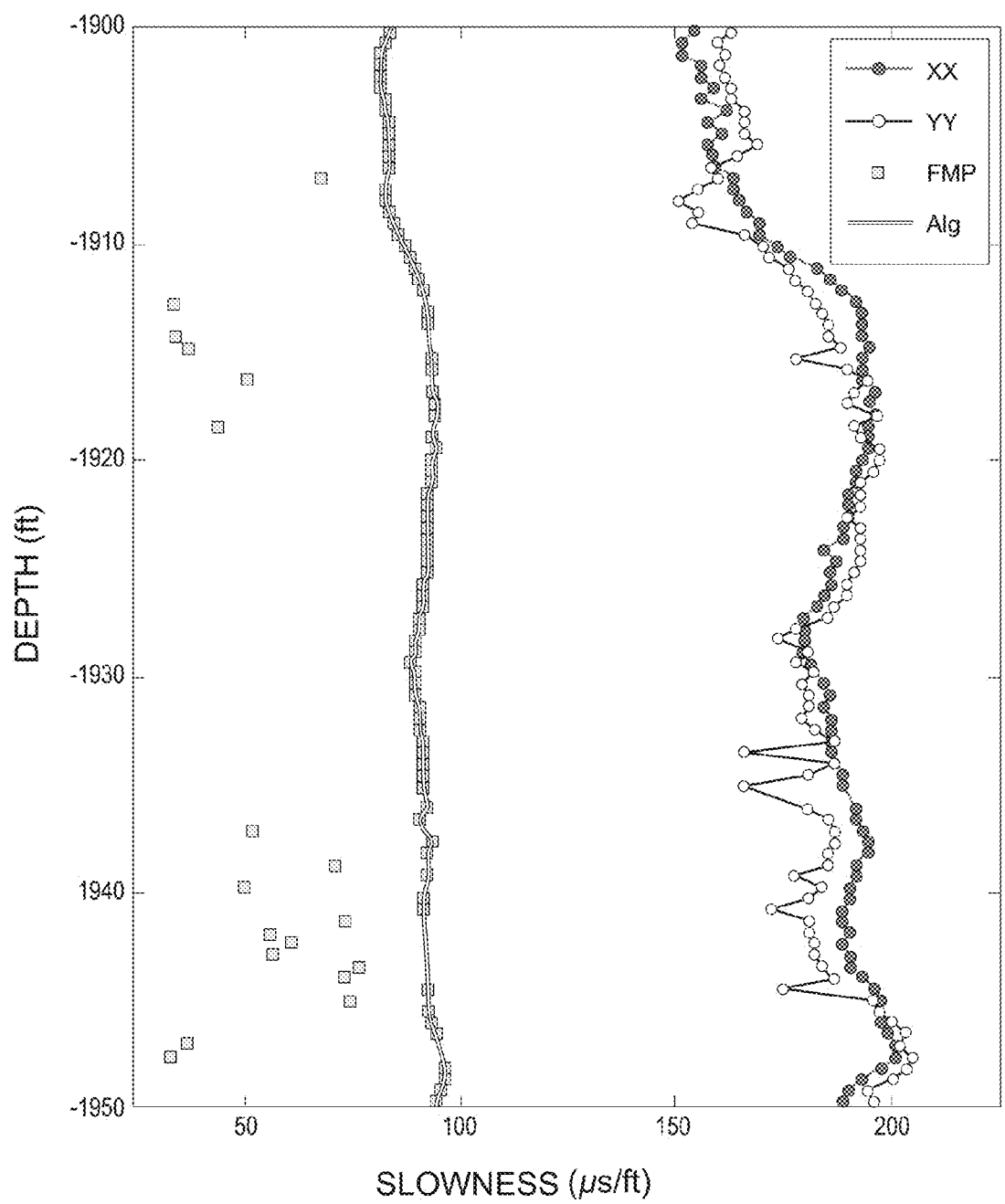
Figure 12:
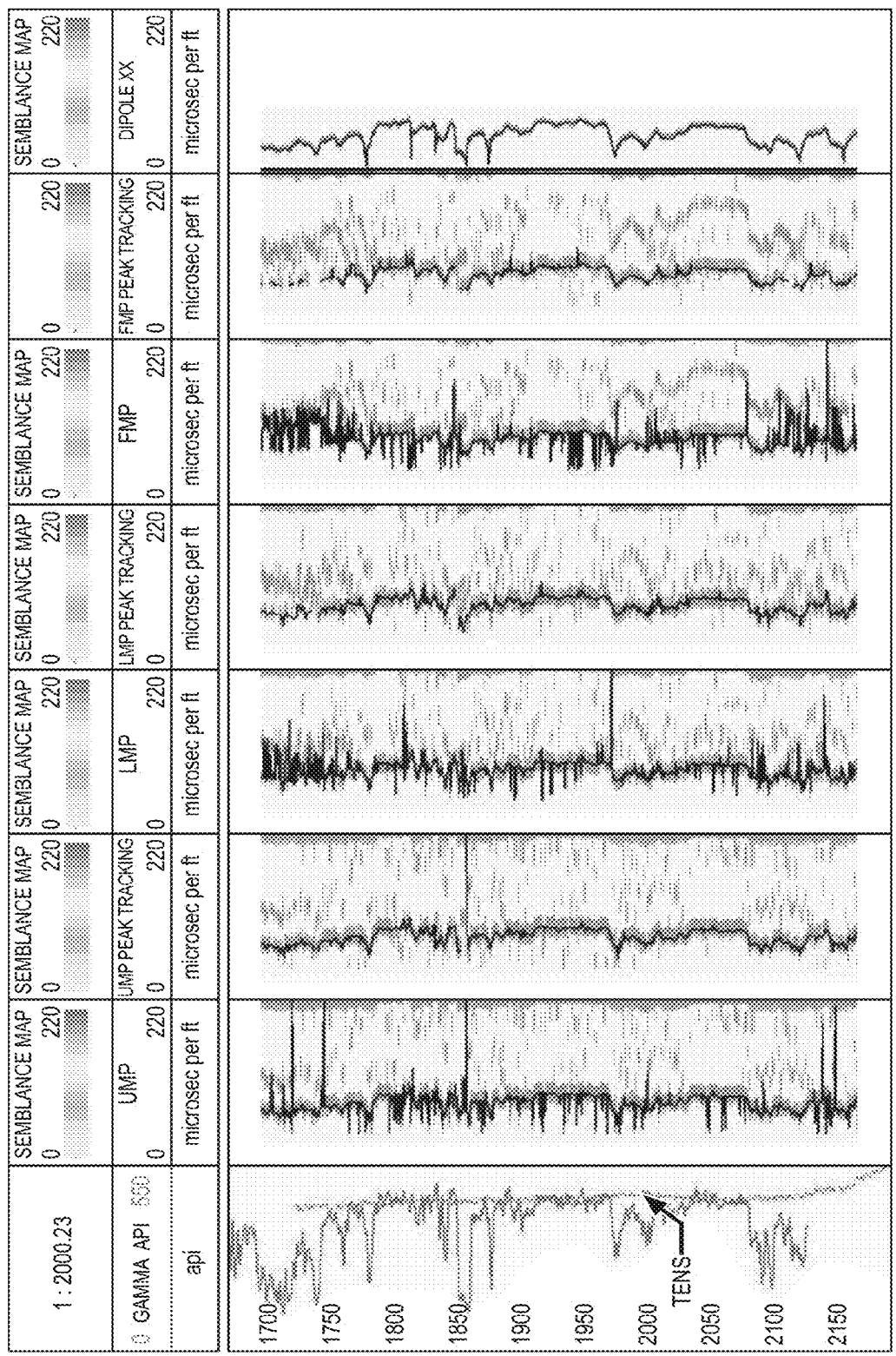

FIGS. 11A, 11B, and 12 are real acoustic logs illustrating the performance of a peak-tracking method in accordance with one embodiment. FIG. 11A shows data with up to three far monopole peaks (depicted with squares) at each depth, which also includes some dipole data with additional random noise added (to test the case of bad dipole data) from two different dipole sources (depicted with circles). The white line connects all the candidate peaks (not shown) that have been selected by the algorithm. Indeed, near 1800 feet, the dipole tracks are both smooth and bad (since the dipole slownesses are far too fast given the compressional tracks in this zone), which causes a range of monopole peaks to be rejected (white line does not plot on top of any symbols). Nonetheless, the tested peak-tracking method successfully rejects some spurious peaks near 1815 ft and between 1840-1850 ft (as can be seen from the solid trace going through the dark squares). FIG. 11B shows data that includes only the fastest far monopole slowness peak (squares), but it is obvious that many of the peaks are spurious given the reasonably smooth dipole data (circles). In this zone, all of the spurious peaks have been rejected. While FIGS. 11A and 11B show only small portions of the overall log data, the peak-tracking method was tested on three different logs over a total length of about two thousand feet, and consistently showed similar levels of performance as reflected in FIGS. 11A and 11B.

FIG. 12 demonstrates the use of peak detection and tracking in accordance herewith on data for three monopole firings (labeled Upper Monopole: UMP, Lower Monopole: LMP, and Far Monopole: FMP) and one dipole firing (labeled XX). In order of increasing slowness, the monopole firings are designed to detect the compressional refracted head wave, shear refracted head wave, and the Stoneley wave for wells in a fast formation. In this medium-to-fast well, the compressional arrival should have a slowness of ~85 μs/ft whereas the Stoneley should have a slowness of ~220 μs/ft. The refracted shear arrival is a clear ~160 μs/ft arrival in the FMP log between 2000' to 2100' depth, and the Stoneley is railing against the right hand side of all monopole plots. There are numerous compressional peaks for most depths, but the tested peak-tracking method in accordance with one embodiment correctly refrains from picking the "noise" that the default method (picking the fastest slowness) picks and appears to be picking a reasonable set of compressional slownesses that are consistent between the UMP, LMP, and FMP firings, showing acceptable performance compared with the default method of picking the fastest slowness.

The following numbered examples are illustrative embodiments:

1. A method comprising: cyclically operating a sonic logging tool deployed within a borehole, each cycle of operation comprising sequentially emitting acoustic waves with at least one monopole acoustic source and at least one dipole acoustic source, and measuring resulting acoustic waveforms with a plurality of receivers; computing semblance maps from the measured acoustic waveforms measured with the plurality of receivers, each semblance map being associated with one of the cycles of operation and an emission from one of the acoustic sources; and, for each of a plurality of the cycles of operation, (i) identifying a plurality of candidate compressional-wave slowness peaks in a semblance map computed for the cycle from measured acoustic waveforms resulting from a monopole acoustic-wave emission, (ii) predicting a compressional-wave slowness peak for the cycle, the prediction being based, for at least one of the plurality of cycles, on compressional-wave slowness peaks detected in neighboring cycles and, for at least one of the plurality of cycles, on a shear-wave slowness peak detected for the cycle in a semblance map computed from measured acoustic waveforms resulting from a dipole acoustic-wave emission, and (iii) comparing the plurality of candidate compressional-wave slowness peaks with the predicted compressional-wave slowness peak and, based on the comparison, selecting, among the plurality of candidate compressional-wave slowness peaks, the peak closest to the predicted compressional-wave slowness peak if it is consistent with the predicted compressional-wave slowness peak.

2. The method of example 1, wherein the neighboring cycles are preceding cycles.

3. The method of example 1 or example 2, wherein the prediction of a compressional-wave slowness peak based on a shear-wave slowness peak is based on a rock-physics constraint.

4. The method of example 3, wherein the rock-physics constraint comprises at least one of a Castagna relation, a Brie relation, a Han relation, or a Krief relation.

5. The method of any of the preceding examples, wherein the predicting comprises: evaluating whether a shear-wave slowness peak for the cycle is available and stable; basing the prediction on the shear-wave slowness peak if it is available and stable; and basing the prediction on compressional-wave slowness peaks of neighboring cycles only if the shear-wave peak is either unavailable or unstable.

6. The method of example 5, wherein evaluating whether the shear-wave slowness peak is stable comprises computing a roughness metric for the slowness peak of the cycle within a sequence of cycles, and comparing the roughness metric against a roughness threshold.

7. The method of any preceding example, wherein predicting the compressional-wave slowness peak based on compressional-wave slowness peaks detected in neighboring cycles comprises fitting a curve to at least two compressional-wave slowness peaks detected in neighboring cycles.

8. The method of example 7, wherein the curve is a polynomial of at least first order.

9. The method of example 7, wherein predicting the compressional-wave slowness peak comprises computing a linear combination of the at least two compressional slowness peaks detected in neighboring cycles, the linear combination comprising linear coefficients determined based on a least-squares fit.

10. The method of any of the preceding examples, wherein comparing the plurality of candidate compressional-wave slowness peaks with the predicted compressional-wave slowness peak comprises determining whether the candidate compressional-wave slowness peak closest to the predicted compressional-wave slowness peak falls within a specified range surrounding the predicted compressional-wave slowness peak.

11. The method of any of the preceding examples, wherein a plurality of parameters used in predicting the compressional-wave slowness peaks and comparing the predicted peaks with the candidate compressional-wave slowness peaks for the plurality of cycles are set based on a tuning method using a plurality of test data sets.

12. The method of example 11, wherein the plurality of parameters comprises at least one of a peak-location threshold associated with predictions based on compressional-wave slowness peaks detected in neighboring cycles, a peak-location threshold associated with predictions based on shear-wave slowness peaks, a roughness threshold associated with shear-wave slowness peaks, a buffer size associated with predictions based on compressional-wave slowness peaks detected in neighboring cycles, and a curve-fitting order associated with predictions based on compressional-wave slowness peaks detected in neighboring cycles.

13. A sonic logging system comprising: a sonic logging tool comprising at least one monopole acoustic source, at least one dipole acoustic source, and a plurality of acoustic receivers, operable in cycles comprising sequential emission of acoustic waves with the at least one monopole acoustic source and the at least one dipole acoustic source and measurements of the resulting acoustic waveforms with the plurality of acoustic receivers; and a processing facility configured to compute semblance maps from the measured acoustic waveforms measured with the plurality of receivers, each semblance map being associated with one of the cycles of operation and an emission from one of the acoustic sources, and, for each of a plurality of the cycles of operation, (i) identify a plurality of candidate compressional-wave slowness peaks in a semblance map computed for the cycle from measured acoustic waveforms resulting from a monopole acoustic-wave emission, (ii) predict a compressional-wave slowness peak for the cycle, the prediction being based, for at least one of the plurality of cycles, on compressional-wave slowness peaks detected in neighboring cycles and, for at least one of the plurality of cycles, on a shear-wave slowness peak detected for the cycle in a semblance map computed from measured acoustic waveforms resulting from a dipole acoustic-wave emission; and (iii) compare the plurality of candidate compressional-wave slowness peaks with the predicted compressional-wave slowness peak and, based on the comparison, select, among the plurality of candidate compressional-wave slowness peaks, the peak closest to the predicted compressional-wave slowness peak if it is consistent with the predicted compressional-wave slowness peak.

14. The system of example 13, wherein the processing facility is configured to predict a compressional-wave slowness peak based on a shear-wave slowness peak using a rock-physics constraint.

15. The system of example 14, wherein the rock-physics constraint comprises at least one of a Castagna relation, a Brie relation, a Han relation, or a Krief relation.

16. The system of any of examples 13-15, wherein the processing facility is configured, when predicting the compressional-wave slowness peak, to evaluate whether a shear-wave slowness peak for the cycle is available and stable; base the prediction on the shear-wave slowness peak if it is available and stable; and base the prediction on compressional-wave slowness peaks of neighboring cycles only if the shear-wave peak is either unavailable or unstable.

17. The system of example 16, wherein the processing facility is configured to evaluate whether the shear-wave slowness peak is stable by computing a roughness metric for the slowness peak of the cycle within a sequence of cycles, and comparing the roughness metric against a roughness threshold.

18. The system of any of examples 13-17, wherein the processing facility is configured to predict the compressional-wave slowness peak based on compressional-wave slowness peaks detected in neighboring cycles by fitting a curve to at least three compressional-wave slowness peaks detected in the neighboring cycles.

19. The system of any of examples 13-18, wherein the processing facility comprises a memory storing a plurality of parameters used in predicting the compressional-wave slowness peaks and comparing the predicted peaks with the candidate compressional-wave slowness peaks for the plurality of cycles, the parameters having been set based on a tuning method using a plurality of test data sets.

20. The system of example 19, wherein the plurality of parameters comprises at least one of a peak-location threshold associated with predictions based on compressional-wave slowness peaks detected in neighboring cycles, a peak-location threshold associated with predictions based on shear-wave slowness peaks, a roughness threshold associated with shear-wave slowness peaks, a buffer size associated with predictions based on compressional-wave slowness peaks detected in neighboring cycles, and a curve-fitting order associated with predictions based on compressional-wave slowness peaks detected in neighboring cycles.

APPENDIX A

When predicting the compressional slowness for a given operational cycle as a weighted average of the previous b compressional slowness peaks, the weights $C_m$ can generally be computed based on a curve fit to the historical data, e.g., using a method described in Hamming's Digital Filters book (3rd ed., pp. 37-44), modified only to account for the fact that some prior values may be missing. In order to compute the filter coefficients for a quadratic least-squares fit through a set of data to make a prediction for the current value, the starting point is the local quadratic fit:

$$u(t) = A + Bt + Ct^2$$

This equation can be discretized (assuming that t is evenly discretized) as follows:

$$u_m = A + (B\Delta t)m + [C(\Delta t)^2]m^2 = A + B'm + C'm^2.$$

Least-squares estimates for A, B', and C' can then be obtained by computing partial derivatives of $$F(A, B', C') = \sum_m [u_m - (A + B'm + C'm^2)]^2$$

with respect to A, B', and C', and setting them to 0. The least-squares solution for the A, B', and C' coefficients amounts to a linear-algebra problem:

$$\begin{pmatrix} S_0 & S_1 & S_2 \\ S_1 & S_2 & S_3 \\ S_2 & S_3 & S_4 \end{pmatrix} \begin{pmatrix} A \\ B' \\ C' \end{pmatrix} = \begin{pmatrix} U_0 \\ U_1 \\ U_2 \end{pmatrix}$$

where $$S_\alpha = \sum_m m^\alpha$$

and $$U_\alpha = \sum_m m^\alpha u_m$$

while the above matrix equation can be straightforwardly solved, a complete solution is generally not necessary to obtain the desired coefficients. The approach here is to use past values of $u_m$ to predict the current value, and then compare that prediction to the actual current value. Let the current value have an index of m=0. Then the predicted value for $u_0$ is just A, which can be computed from Cramer's rule as:

$$A = \frac{\begin{vmatrix} U_0 & U_1 & U_2 \\ S_1 & S_2 & S_3 \\ S_2 & S_3 & S_4 \end{vmatrix}}{\begin{vmatrix} S_0 & S_1 & S_2 \\ S_1 & S_2 & S_3 \\ S_2 & S_3 & S_4 \end{vmatrix}} = \sum_m c_m u_m$$

Expanding the determinants, and collecting terms, gives $$c_m = [D_1 - D_2 \cdot m + D_3 \cdot m^2]/D_0,$$

where $$D_0 = \begin{vmatrix} S_0 & S_1 & S_2 \\ S_1 & S_2 & S_3 \\ S_2 & S_3 & S_4 \end{vmatrix}$$

$$D_1 = \begin{vmatrix} S_2 & S_3 \\ S_3 & S_4 \end{vmatrix}$$

$$D_2 = \begin{vmatrix} S_1 & S_3 \\ S_2 & S_4 \end{vmatrix}$$

$$D_3 = \begin{vmatrix} S_1 & S_2 \\ S_2 & S_3 \end{vmatrix}$$

For example, if the four previous points in the buffer were always used to make the prediction (no BADVAL picks exist), then the coefficients would always be $C_{-4}=0.75$, $c_{-3}=-1.25$, $c_{-2}=-0.75$, and $C_{-1}=2.25$; the coefficient calculation need only be performed once. If there is the possibility of missing data, however, then only the non-missing indices are used in the calculation, and the calculation is performed for each unique set of indices. Since the coefficients only depend on the unique set of indices that are present, the calculation can be cached for each permutation of indices instead of being performed for every point.

While the disclosed subject matter has been described and illustrated herein with regard to specific embodiments and details, many variations may be made to the described systems, tools, and methods without departing from the scope of the inventive subject matter. For example, while details of peak-detection and -tracking methods in accordance herewith have been described in the context of coherence-based semblance methods using time-slowness semblance maps, the general approach of improving peak detection and tracking with predictions based on a combination of historical and/or future tracking data and rock-physics constraints that relate the signal of interest to another, more reliably detectable signal is also applicable to amplitude-based semblance methods and semblance maps with dimensions of frequency instead of time and/or velocity instead of slowness. Further, improved peak detection and tracking in accordance herewith is not necessarily limited to tracking the compressional-wave velocity (using the shear-wave velocity for consistency checks), but may also be applied to other signals. Accordingly, the disclosed example embodiments are intended to be illustrative and not limiting.

What is claimed is:

1. A method comprising:
  cyclically operating a sonic logging tool deployed within a borehole, each cycle of operation comprising, at a determined depth, sequentially emitting acoustic waves with at least one monopole acoustic source and at least one dipole acoustic source, and measuring resulting acoustic waveforms with a plurality of receivers;
  computing semblance maps from the measured acoustic waveforms measured with the plurality of receivers, each semblance map being associated with one of the cycles of operation and an emission from one of the acoustic sources;
  for each of a plurality of the cycles of operation,
    determining that a dipole-based shear peak, determined from dipole measured acoustic waveforms resulting from emissions from at least one of the dipole acoustic sources, is unavailable for predicting a compressional peak for the cycle;

identifying, in response to the determining that the dipole-based shear peak is unavailable, a plurality of candidate compressional-wave slowness peaks in a semblance map computed for the cycle from monopole measured acoustic waveforms resulting from a monopole acoustic-wave emission from at least one of the monopole acoustic sources;

predicting a compressional-wave slowness peak for the cycle, the prediction being based, for at least one of the plurality of cycles, on compressional-wave slowness peaks detected in neighboring cycles and, for at least one of the plurality of cycles, on a shear-wave slowness peak detected for the cycle in a semblance map computed from measured acoustic waveforms resulting from a dipole acoustic-wave emission;

comparing the plurality of candidate compressional-wave slowness peaks with the predicted compressional-wave slowness peak; and based on the comparison, selecting, among the plurality of candidate compressional-wave slowness peaks, the peak closest to the predicted compressional-wave slowness peak as the compressional peak for the cycle if it is consistent with the predicted compressional-wave slowness peak;

aggregating at least the compressional peaks for the plurality of cycles into an acoustic log as a function of depth; and generating the acoustic log.

2. The method of claim 1, wherein the neighboring cycles are preceding cycles.

3. The method of claim 1, wherein the prediction of a compressional-wave slowness peak based on a shear-wave slowness peak is based on a rock-physics constraint.

4. The method of claim 3, wherein the rock-physics constraint comprises at least one of a Castagna relation, a Brie relation, a Han relation, or a Krief relation.

5. The method of claim 1, wherein the predicting comprises evaluating whether a shear-wave slowness peak for the cycle is available and stable;

basing the prediction on the shear-wave slowness peak if it is available and stable; and basing the prediction on compressional-wave slowness peaks of neighboring cycles only if the shear-wave peak is either unavailable or unstable.

6. The method of claim 5, wherein evaluating whether the shear-wave slowness peak is stable comprises computing a roughness metric for the slowness peak of the cycle within a sequence of cycles, and comparing the roughness metric against a roughness threshold.

7. The method of claim 1, wherein predicting the compressional-wave slowness peak based on compressional-wave slowness peaks detected in neighboring cycles comprises fitting a curve to at least two compressional-wave slowness peaks detected in neighboring cycles.

8. The method of claim 7, wherein the curve is a polynomial of at least first order.

9. The method of claim 7, wherein predicting the compressional-wave slowness peak comprises computing a linear combination of the at least two compressional slowness peaks detected in neighboring cycles, the linear combination comprising linear coefficients determined based on a least-squares fit.

10. The method of claim 1, wherein comparing the plurality of candidate compressional-wave slowness peaks with the predicted compressional-wave slowness peak comprises determining whether the candidate compressional-wave slowness peak closest to the predicted compressional-wave slowness peak falls within a specified range surrounding the predicted compressional-wave slowness peak.

11. The method of claim 1, wherein a plurality of parameters used in predicting the compressional-wave slowness peaks and comparing the predicted peaks with the candidate compressional-wave slowness peaks for the plurality of cycles are set based on a tuning method using a plurality of test data sets.

12. The method of claim 11, wherein the plurality of parameters comprises at least one of a peak-location threshold associated with predictions based on compressional-wave slowness peaks detected in neighboring cycles, a peak-location threshold associated with predictions based on shear-wave slowness peaks, a roughness threshold associated with shear-wave slowness peaks, a buffer size associated with predictions based on compressional-wave slowness peaks detected in neighboring cycles, and a curve-fitting order associated with predictions based on compressional-wave slowness peaks detected in neighboring cycles.

13. A sonic logging system comprising:

a sonic logging tool comprising at least one monopole acoustic source, at least one dipole acoustic source, and a plurality of acoustic receivers, operable in cycles comprising sequential emission of acoustic waves with the at least one monopole acoustic source and the at least one dipole acoustic source and measurements of resulting acoustic waveforms with the plurality of acoustic receivers; and a processing facility configured to:

operate the sonic logging tool at a plurality of depths;

compute, at each of the depths, semblance maps from the measured acoustic waveforms measured with the plurality of receivers, each semblance map being associated with one of the cycles of operation and an emission from one of the acoustic sources;

for each of a plurality of cycles of operation, determining that a dipole-based shear peak, determined from dipole measured acoustic waveforms resulting from emissions from at least one of the dipole acoustic sources, is unavailable for predicting a compressional peak for the cycle;

identify, in response to the determining that the dipole-based shear peak is unavailable, a plurality of candidate compressional-wave slowness peaks in a semblance map computed for the cycle from monopole measured acoustic waveforms resulting from a monopole acoustic-wave emission from at least one of the monopole acoustic sources;

predict a compressional-wave slowness peak for the cycle, the prediction being based, for at least one of the plurality of cycles, on compressional-wave slowness peaks detected in neighboring cycles and, for at least one of the plurality of cycles, on a shear-wave slowness peak detected for the cycle in a semblance map computed from measured acoustic waveforms resulting from a dipole acoustic-wave emission;

compare the plurality of candidate compressional-wave slowness peaks with the predicted compressional-wave slowness peak; and based on the comparison, select, among the plurality of candidate compressional-wave slowness peaks, the peak closest to the predicted compressional-wave slowness peak as the compressional peak for the cycle if it is consistent with the predicted compressional-wave slowness peak;

aggregating at least the compressional peaks for the plurality of cycles into an acoustic log as a function of depth; and generating the acoustic log.

14. The system of claim 13, wherein the processing facility is configured to predict a compressional-wave slowness peak based on a shear-wave slowness peak using a rock-physics constraint.

15. The system of claim 14, wherein the rock-physics constraint comprises at least one of a Castagna relation, a Brie relation, a Han relation, or a Krief relation.

16. The system of claim 13, wherein the processing facility is configured, when predicting the compressional-wave slowness peak, to evaluate whether a shear-wave slowness peak for the cycle is available and stable;

base the prediction on the shear-wave slowness peak if it is available and stable; and base the prediction on compressional-wave slowness peaks of neighboring cycles only if the shear-wave peak is either unavailable or unstable.

17. The system of claim 16, wherein the processing facility is configured to evaluate whether the shear-wave slowness peak is stable by computing a roughness metric for the slowness peak of the cycle within a sequence of cycles, and comparing the roughness metric against a roughness threshold.

18. The system of claim 13, wherein the processing facility is configured to predict the compressional-wave slowness peak based on compressional-wave slowness peaks detected in neighboring cycles by fitting a curve to at least two compressional-wave slowness peaks detected in the neighboring cycles.

19. The system of claim 13, wherein the processing facility comprises a memory storing a plurality of parameters used in predicting the compressional-wave slowness peaks and comparing the predicted peaks with the candidate compressional-wave slowness peaks for the plurality of cycles, the parameters having been set based on a tuning method using a plurality of test data sets.

20. The system of claim 19, wherein the plurality of parameters comprises at least one of a peak-location threshold associated with predictions based on compressional-wave slowness peaks detected in neighboring cycles, a peak-location threshold associated with predictions based on shear-wave slowness peaks, a roughness threshold associated with shear-wave slowness peaks, a buffer size associated with predictions based on compressional-wave slowness peaks detected in neighboring cycles, and a curve-fitting order associated with predictions based on compressional-wave slowness peaks detected in neighboring cycles.

* * * * *